(12) United States Patent
Morreale et al.

(10) Patent No.: US 9,810,095 B2
(45) Date of Patent: Nov. 7, 2017

(54) SEALING DEVICE FOR AN OIL ENCLOSURE IN A TURBINE ENGINE BEARING

(71) Applicant: SNECMA, Paris (FR)

(72) Inventors: Serge Rene Morreale, Guignes (FR); Dominik Igel, Hericy (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 15/099,880

(22) Filed: Apr. 15, 2016

(65) Prior Publication Data

US 2016/0305283 A1 Oct. 20, 2016

(30) Foreign Application Priority Data

Apr. 17, 2015 (FR) ..................... 15 53466

(51) Int. Cl.
*F16J 15/34* (2006.01)
*F01D 25/18* (2006.01)
(Continued)

(52) U.S. Cl.
CPC ............ *F01D 25/183* (2013.01); *F01D 11/02* (2013.01); *F01D 25/16* (2013.01); *F02C 7/28* (2013.01);
(Continued)

(58) Field of Classification Search
CPC ........ F01D 11/00; F01D 11/02; F01D 11/025; F04D 29/10; F04D 29/102; F04D 29/12;
(Continued)

(56) References Cited

U.S. PATENT DOCUMENTS 4,754,984 A * 7/1988 Keba .................. F16J 15/441
277/350
6,382,632 B1 5/2002 Chupp et al.
(Continued)

FOREIGN PATENT DOCUMENTS

| FR | 2 997 470 A1 | 5/2014 |
| FR | 2 998 611 A1 | 5/2014 |
| GB | 2 315 302 A | 1/1998 |

OTHER PUBLICATIONS

French Preliminary Search Report issued Mar. 4, 2016 in French Application 15 53466, filed Apr. 17, 2015 (with English Translation of Categories of Cited Documents).

*Primary Examiner* — Gilbert Lee
(74) *Attorney, Agent, or Firm* — Oblon, McClelland, Maier & Neustadt, L.L.P.

(57) ABSTRACT

A sealing device for a turbine engine bearing oil enclosure including a rotor shaft; an annular cover secured to an engine casing and arranged around the rotor shaft to co-operate therewith to define an oil enclosure that is to receive a bearing rotatably supporting the rotor shaft relative to the engine casing; a labyrinth seal mounted on the rotor shaft facing one end of the cover; an annular rim mounted inside the cover; a dynamic annular gasket interposed radially between the rim and the rotor shaft; and a clip for axially blocking the rim inside the cover and including at least one latch passing radially through the rim and being received radially inside a groove formed in the cover, is provided.

10 Claims, 3 Drawing Sheets

(51) Int. Cl.
*F01D 25/16* (2006.01)
*F16J 15/00* (2006.01)
*F16J 15/3252* (2016.01)
*F16J 15/3268* (2016.01)
*F16J 15/447* (2006.01)
*F01D 11/02* (2006.01)
*F02C 7/28* (2006.01)
*F16J 15/16* (2006.01)
*F16J 15/324* (2016.01)
*F16J 15/44* (2006.01)

(52) U.S. Cl.
CPC ........... *F16J 15/002* (2013.01); *F16J 15/162* (2013.01); *F16J 15/324* (2013.01); *F16J 15/3252* (2013.01); *F16J 15/3268* (2013.01); *F16J 15/442* (2013.01); *F16J 15/447* (2013.01); *F05D 2220/30* (2013.01); *F05D 2240/55* (2013.01); *F05D 2260/98* (2013.01)

(58) Field of Classification Search
CPC .... F04D 29/122; F16J 15/3272; F16J 15/447; F16J 15/4472; F16J 15/4474; F16J 15/4476; F16J 15/4478
See application file for complete search history.

(56) References Cited

U.S. PATENT DOCUMENTS

| | | | |
|---|---|---|---|
| 2013/0015018 A1* | 1/2013 | Gauthier | F01D 11/001 184/6.11 |
| 2015/0050130 A1* | 2/2015 | Morreale | F01D 11/02 415/170.1 |
| 2015/0063981 A1* | 3/2015 | Pierrot | F01D 25/183 415/111 |
| 2015/0300191 A1 | 10/2015 | Morreale et al. | |

\* cited by examiner

SEALING DEVICE FOR AN OIL ENCLOSURE IN A TURBINE ENGINE BEARING

BACKGROUND OF THE INVENTION

The present invention relates to the general field of oil enclosures for a rolling bearing in a turbine engine. The invention relates more particularly to a device for providing such an enclosure with sealing relative to a neighboring air enclosure.

In known manner, a turbine engine has a certain number of rolling bearings that are for providing rotor shaft of the engine with rotary support, in particular relative to a stationary support connected to a casing of the engine.

In operation, oil is typically injected onto the rolling elements of such bearings in order to lubricate them and to cool them. In order to prevent the oil from spreading throughout the engine, it is necessary to confine rolling bearings inside oil enclosures and to provide such oil enclosures with sealing relative to neighboring air enclosures of the engine, which often need to be free of oil.

More precisely, certain oil enclosures are defined between the rotor shaft given rotary support by the rolling bearing and an annular cover that is secured to a stationary support connected to the engine casing and arranged around the rotor shaft. A dynamic annular gasket is generally positioned between the rotor shaft and the cover in order to provide sealing between the oil enclosure and an air enclosure neighboring it. Typically, the dynamic gasket is mounted inside a rim, which is itself fastened to the cover by means of a plurality of fastener screws.

Nevertheless, such a configuration presents certain drawbacks. In particular, the heads of the screws fastening the rim to the cover are often to be found on the path of the flow of oil injected into the oil enclosure in order to lubricate and cool the roiling elements of the bearing, running the risk of oil splashing and running off in ways that can lead to leaks to the neighboring air enclosure. In addition, the zone where the dynamic annular gasket is mounted is difficult to access, since it is located in a confined space. There therefore exists a need to make it easier to mount the gasket between the rotor shaft and the cover.

OBJECT AND SUMMARY OF THE INVENTION

An object of the present invention is thus to provide a sealing device for a turbine engine bearing oil enclosure that does not present the above-mentioned drawbacks.

In accordance with the invention, this object is achieved by a sealing device comprising a rotor shaft, an annular cover secured to an engine casing and arranged around the rotor shaft to co-operate therewith to define an oil enclosure that is to receive a bearing rotatably supporting the rotor shaft relative to the engine casing, a labyrinth seal mounted on the rotor shaft facing one end of the cover, an annular rim mounted inside the cover, a dynamic annular gasket interposed radially between the rim and the rotor shaft, and a clip for axially blocking the rim inside the cover and including at least one latch passing radially through the rim and being received radially inside a groove formed in the cover.

The sealing device of the invention is remarkable in particular in that it does not have screws for fastening the rim to the cover. This fastening is provided by the blocking clip that has a latch passing radially through the rim and that is received radially inside a groove formed in the cover (which groove may be an annular groove or a notch). The lack of screws thus avoids any risk of causing oil to splash and run off in a manner that can lead to leaks towards the neighboring air enclosure. Given the location of the labyrinth seal, the zone in which the dynamic gasket is mounted can be accessed only from beside the bearing in the oil enclosure. The proposed fastening is then particularly advantageous since it makes it possible for mounting to be simple and access to the dynamic annular gasket to be facilitated.

In an embodiment, the axial blocking clip comprises a resilient pin that is received inside the rim and that is provided with a latch passing radially through the rim and being received radially inside the groove formed in the cover, and means for locking the resilient pin inside the rim.

In this embodiment, the axial blocking clip may include at least one catch secured to the resilient pin for being received radially in a hole formed in the rim so as to lock the resilient pin inside the rim.

Alternatively, the axial blocking clip may include at least one stud forced radially into a hole formed in the rim and coming into radial abutment against the resilient pin to lock it inside the rim.

In another embodiment, the axial blocking clip comprises a rigid pin received inside the rim and provided with a latch passing radially through the rim and being received radially inside the groove formed in the cover, and a flexible holder pin for holding the rigid pin inside the rim.

In this other embodiment, the flexible holder pin may come circumferentially into abutment against the rigid pin and may include projections projecting radially outwards for blocking the flexible holder pin inside the rim by expansion of the pin.

Likewise, the flexible holder pin may include a latch passing radially through the rim and received radially inside the groove formed in the cover. Under such circumstances, the latch of the rigid pin and the latch of the flexible holder pin are preferably diametrically opposite each other, thereby improving the axial blocking of the rim inside the cover.

Preferably, the rim includes, at an upstream end, a shoulder projecting radially outwards and axially upstream relative to the cover.

The invention also provides a turbine engine including at least one bearing oil enclosure provided with a sealing device as defined above.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

Figure 1:
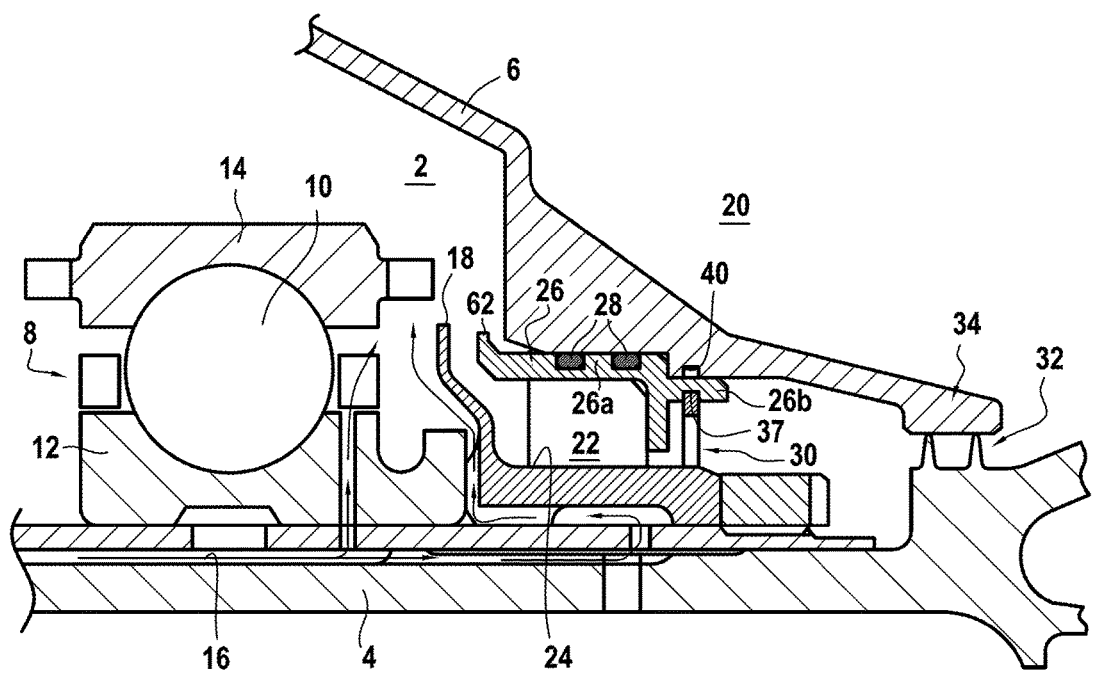
FIG. 1 is a diagrammatic section view of a sealing device of the invention in its environment.

FIG. 1 is a diagrammatic and fragmentary view of an oil enclosure 2 for a turbine engine bearing to which the invention applies.

This oil enclosure 2 is defined on the inside by a rotor shaft 4, and on the outside by an annular cover 6 that is secured to a support fastened to the casing of the turbine engine and that is arranged around the rotor shaft 4.

This oil enclosure 2 contains a bearing 8 having a plurality of rolling elements 10 engaged between an inner ring 12 mounted on the rotor shaft 4 of the engine and an outer ring 14 secured to a casing of the engine (not shown in the figure).

Furthermore, oil is injected into the oil enclosure 2 in order to lubricate and cool the rolling elements 10 of the bearing. For this purpose, oil flows from upstream to downstream inside axial ducts 16 made along the rotor shaft 4 and opening out radially firstly in register with the rolling elements 10 by passing through the inner ring 12 of the bearing, and secondly downstream therefrom at a "droplet-launcher" 18 for centrifuging cooling oil from a gasket 22 towards the largest inside radius of the oil enclosure and to deflect particles of oil away from the sealing device described below (the path followed by the oil is represented by arrows in FIG. 1).

Downstream from the droplet-launcher 18, the oil enclosure 2 has a sealing device in accordance with the invention for providing the oil enclosure with sealing relative to a neighboring air enclosure 20 that must be free of oil.

To this end, the sealing device of the invention comprises in particular a dynamic annular gasket 22 that is associated with a rotary surface 24 of the droplet-launcher 18 carried by the rotor shaft 4. Typically, the dynamic gasket 22 is made up of carbon ring segments and the rotary surface 24 is treated to improve segment-on-track sliding. Furthermore, it can be seen in FIG. 1 that a portion of the oil flows under the rotary surface 24 so as to lubricate it and cool it, with its heating being a result of coming into contact with the dynamic gasket 22.

The dynamic gasket 22 is held in an annular rim 26, itself mounted inside the cover 6. The rim 26 has a portion 26a of L-shaped section that receives the dynamic gasket 22 and that is extended downstream by an annular collar 26b.

The rim 26 is mounted as a sliding fit inside the cover 6. The portion 26a of L-shaped section presents grooves on the outside that receive O-rings 28 for providing sealing with the cover 6;

Furthermore, the rim 26 is blocked axially inside the cover 6 by means of an axial blocking clip 30, various embodiments of which are described below with reference to FIGS. 2 to 6.

Downstream from the dynamic gasket 22, the device of the invention for sealing the oil enclosure 2 also has a labyrinth seal 32 that is mounted on the rotor shaft 4 that has its static portion 34 carried by the cover 6, at a downstream end thereof. This labyrinth seal 32 serves to limit the drop of air pressure in the air enclosure 20 in the event of carbon segments constituting the gasket 22 being destroyed.

With reference to FIGS. 2, 2A, and 3 to 6, there follows a description of various embodiments of the clip for axially blocking the rim 26 inside the cover 6.

Figures 2, 2A:
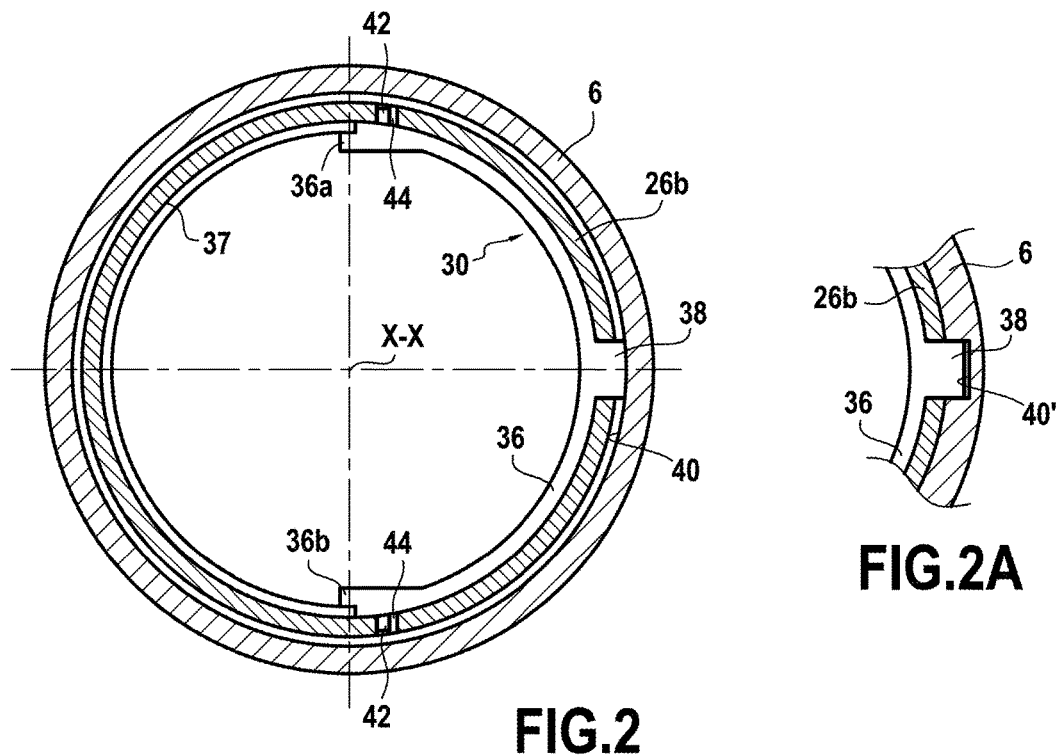
FIG. 2 is a side view of an axial blocking clip of the sealing device in an embodiment of the invention.
FIG. 2A is a fragmentary view showing a variant embodiment of the blocking of the clip in the FIG. 2 sealing device.

In the embodiment of FIG. 2, the axial blocking clip 30 comprises a resilient pin 36 that is received radially inside the rim 26.

This resilient pin 36 is in the form of half an annulus centered on the longitudinal axis X-X of the engine and when in position it is received inside an annular groove 37 centered on the axis X-X and formed in the collar 26b of the rim (FIG. 1).

At equal distances from its two free ends 36a and 36b, the resilient pin is provided with a latch 38 that, when in position, is to pass radially through the rim (and more precisely its collar 26b) and be received radially inside an annular groove 40 formed in the cover 6 all around its circumference. In a variant, and as shown in part in FIG. 2A, the latch 38 of the resilient pin can pass radially through the rim and be received inside a notch 40' formed in the cover 6.

Furthermore, means are provided for locking the resilient pin 36 in position inside the rim 6. Thus, in the embodiment of FIG. 2, the axial blocking clip 30 has two catches 42, each secured to a free end 36a, 36b of the resilient pin 36 and each being received, when in position, radially in a hole 44 formed in the rim so as to lock the resilient pin inside the rim.

Thus, in this embodiment, the catches 42 for locking the resilient pin inside the rim form integral portions of the resilient pin. While it is being put into place, the resilient pin 36 is moved axially from downstream to upstream inside the rim 6, until in is received in the grooves 37 therein and until the catches 42 move as a result of the resilient pin expanding so as to be received inside the holes 44 of the rim and until the latch 38 becomes inserted in the annular groove 40 (or the notch 40'—FIG. 2A) of the cover 6.

Figure 3:
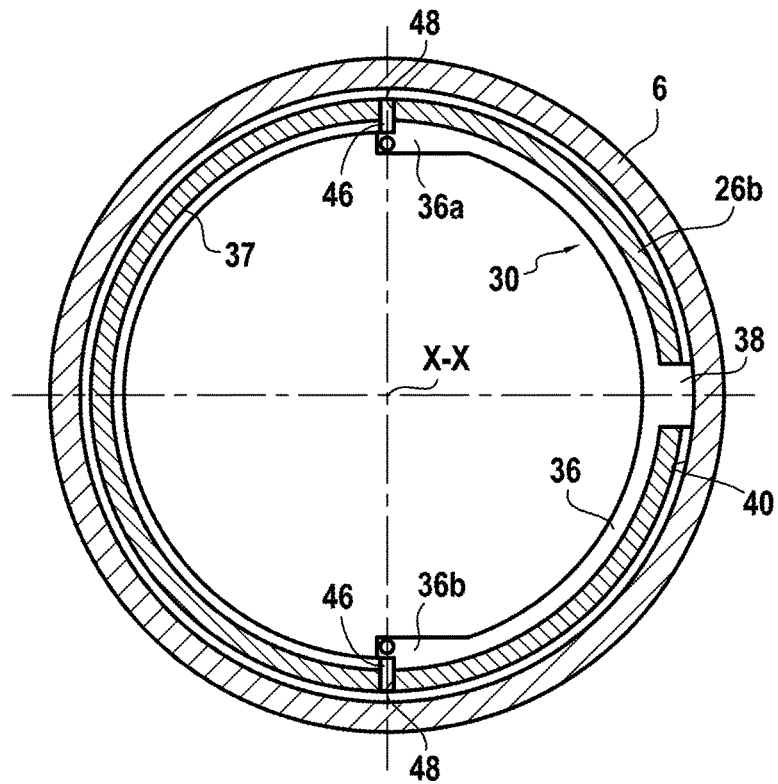
FIGS. 3 to 5 are side views of an axial blocking clip of the sealing device in other embodiments of the invention.

FIG. 3 shows a variant embodiment of the means for locking the resilient pin 36 in position inside the rim 6. In this variant, the axial blocking clip 30 has two studs 46 that are forced radially into holes 48 formed in the rim 26 and each of which comes into radial abutment against a free end 36a of the resilient pin in order to lock it inside the rim. Thus, the studs 46 and the resilient pin 36 block one another mutually.

Figure 4:
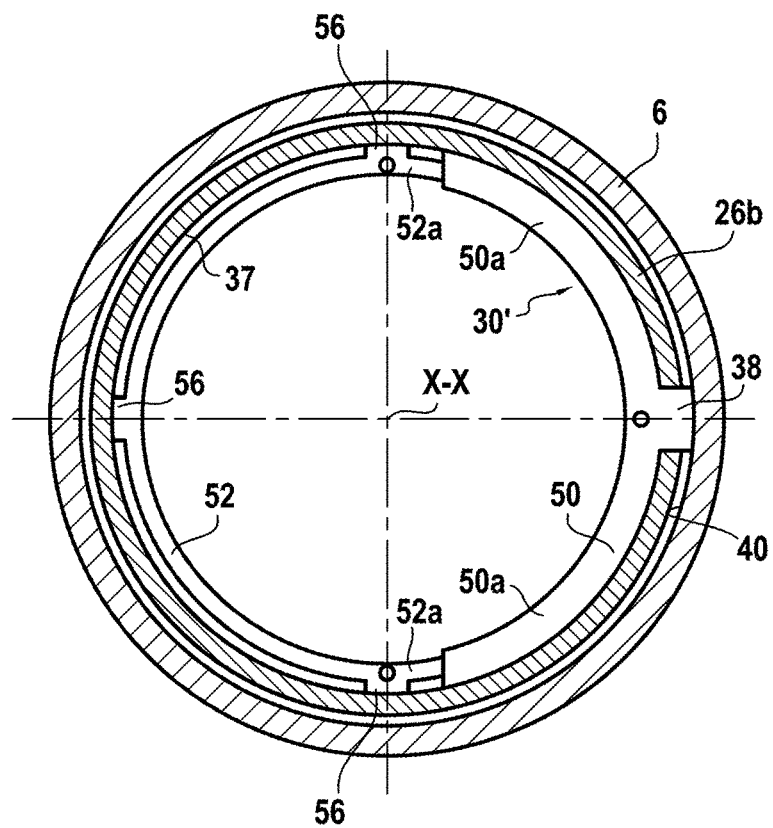

FIG. 4 shows another embodiment of the clip 30' for axially blocking the rim 26 inside the cover 6.

In this embodiment, the axial blocking clip 30' comprises a rigid pin 50 and a flexible holder pin 52, each in the form of half an annulus centered on the longitudinal axis X-X of the engine, both of which are received radially inside the rim 6.

The rigid pin 50 has a latch 54 that, when in position, passes radially through the rim (and more precisely its collar 26b) and is received radially inside an annular groove 40 (or a notch identical to that described with reference to FIG. 2A) formed in the cover 6.

Furthermore, the flexible holder pin 52 has the function of holding the rigid pin 50 inside the rim. For this purpose, when in position, the flexible holder pin 52 comes into circumferential abutment against each free end 50a of the rigid pin.

In order to block the flexible holder pin 52 inside the rim, provision is made for it to have projections 56 (e.g. one projection at each of its free ends 52a and a projection halfway between its free ends) that project radially outwards and that, when in position, become blocked inside the groove 37 of the rim as a result of the flexible holder pin expanding.

The blocking clip 30' is mounted as follows. The rigid pin 50 is initially inserted from downstream to upstream inside the rim 6 until it becomes received in the groove 37 therein, and until its latch 54 becomes inserted in the annular groove 40 (or the notch) in the cover 6. Thereafter, the flexible holder pin 52 is inserted in the same manner, and its projections 56 become wedged by expansion inside the groove 37 of the rim, thereby holding the rigid pin in place. Advantageously, such assembly is particularly easy to implement, and is performed from beside the oil enclosure, the provision of the labyrinth seal 32 preventing assembly from another side.

Figure 5:
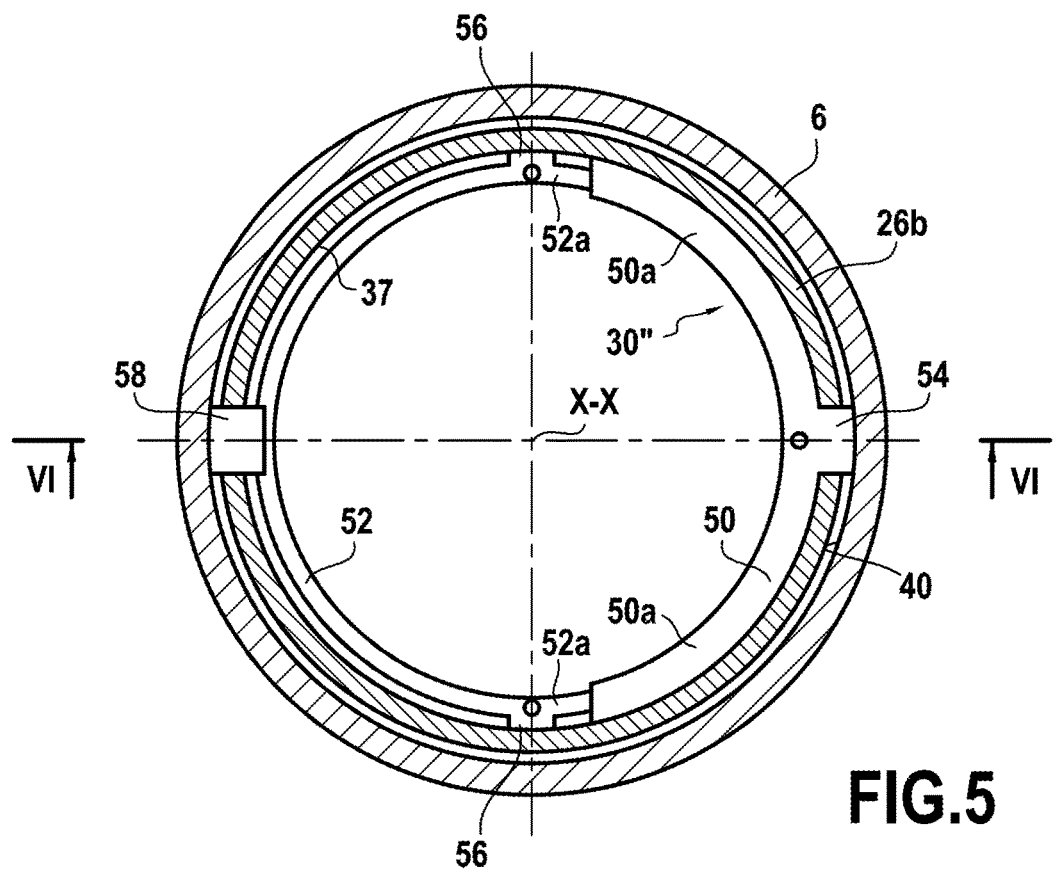
Figure 6:
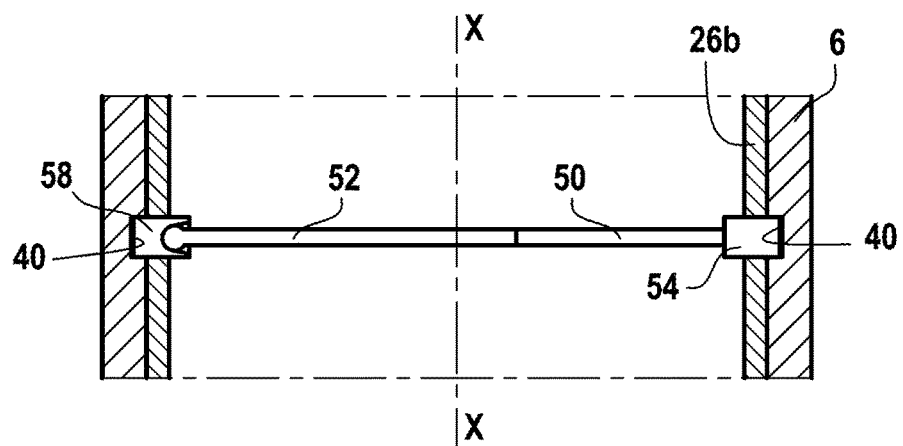
FIG. 6 is a section view on VI-VI of FIG. 5.

FIGS. 5 and 6 show yet another embodiment of the clip 30" for axially blocking the rim 26 inside the cover 6.

This clip 30" differs from that described with reference to FIG. 4 in that the flexible holder pin 52 also has an additional latch 58 that, when in position, passes radially through the rim (and more precisely its collar 26b) and is received radially inside the annular groove 40 of the cover 6 (or where appropriate inside an additional notch).

Preferably, the latch 54 of the rigid pin 50 and the latch 58 of the flexible holder pin 52 are diametrically opposite each other. In this configuration, the flexible holder pin 52 has only two projections 56, at each of its free ends 52a.

As shown in FIG. 6, the latch 58 of the flexible holder pin is advantageously hinged relative to the flexible holder pin, thereby enabling the assembly to be given an axis for disengaging the flexible holder pin.

In an advantageous provision that is common to all of the embodiments described, the rim 6, and more precisely its portion 26a of L-shaped section, includes a shoulder 62 at its upstream end projecting radially outwards and axially upstream relative to the cover 6.

This shoulder 62 has two functions. Firstly it serves to channel oil running towards the low portion of the oil enclosure around the gasket, and secondly it serves as an extractor for removing the rim 26 from the cover (after removing the axial blocking pin) by means of tooling passing through the downstream bore of the rim.

The invention claimed is:

1. A sealing device for a turbine engine bearing oil enclosure, comprising:
   a rotor shaft;
   an annular cover secured to an engine casing and arranged around the rotor shaft to co-operate therewith to define an oil enclosure that is to receive a bearing rotatably supporting the rotor shaft relative to the engine casing;
   a labyrinth seal mounted on the rotor shaft facing one end of the cover;
   an annular rim mounted inside the cover;
   a dynamic annular gasket interposed radially between the rim and the rotor shaft; and
   a clip for axially blocking the rim inside the cover and including at least one latch passing radially through an annular groove formed in the rim and being received radially inside a groove formed in the cover.

2. A device according to claim 1, wherein the axial blocking clip comprises a resilient pin received inside the rim and provided with a latch passing radially through the annular groove formed in the rim and being received radially inside the groove formed in the cover, and means for locking the resilient pin inside the rim.

3. A device according to claim 2, wherein the axial blocking clip includes at least one catch secured to the resilient pin for being received radially in a hole formed in the rim so as to lock the resilient pin inside the rim.

4. A device according to claim 2, wherein the axial blocking clip includes at least one stud forced radially into a hole formed in the rim and coming into radial abutment against the resilient pin to lock the resilient pin inside the rim.

5. A device according to claim 1, wherein the axial blocking clip comprises a rigid pin received inside the rim and provided with a latch passing radially through the annular groove formed in the rim and being received radially inside the groove formed in the cover, and a flexible holder pin for holding the rigid pin inside the rim.

6. A device according to claim 5, wherein the flexible holder pin comes circumferentially into abutment against the rigid pin and includes projections projecting radially outwards for blocking the flexible holder pin inside the rim by expansion of the pin.

7. A device according to claim 5, wherein the flexible holder pin includes a latch passing radially through the rim and received radially inside the groove formed in the cover.

8. A device according to claim 7, wherein the latch of the rigid pin and the latch of the flexible holder pin are diametrically opposite each other.

9. A device according to claim 1, wherein the rim includes, at an upstream end, a shoulder projecting radially outwards and axially upstream relative to the cover.

10. A turbine engine including at least one bearing oil enclosure provided with a sealing device according to claim 1.

* * * * *